United States Patent
Patrick

(10) Patent No.: US 11,850,969 B1
(45) Date of Patent: Dec. 26, 2023

(54) PORTABLE MOTORIZED VEHICLES

(71) Applicant: INTERCONTINENTAL MOBILITY COMPANY, Brooklyn, NY (US)

(72) Inventor: Christopher R Patrick, Brooklyn, NY (US)

(73) Assignee: INTERCONTINENTAL MOBILITY COMPANY, Brooklyn, NY (US)

(*) Notice: Subject to any disclaimer, the term of this patent is extended or adjusted under 35 U.S.C. 154(b) by 0 days.

(21) Appl. No.: 18/225,597

(22) Filed: Jul. 24, 2023

Related U.S. Application Data

(63) Continuation of application No. PCT/US2023/025629, filed on Jun. 16, 2023.

(60) Provisional application No. 63/400,128, filed on Aug. 23, 2022.

(51) Int. Cl.
| | | |
|---|---|---|
| *B60L 58/00* | (2019.01) | |
| *B60L 58/19* | (2019.01) | |
| *B60L 50/60* | (2019.01) | |
| *B62K 15/00* | (2006.01) | |
| *B62J 50/22* | (2020.01) | |
| *B60L 58/12* | (2019.01) | |

(52) U.S. Cl.
CPC ............... *B60L 58/19* (2019.02); *B60L 50/66* (2019.02); *B60L 58/12* (2019.02); *B62J 50/22* (2020.02); *B62K 15/006* (2013.01); *B60L 2200/12* (2013.01)

(58) Field of Classification Search
CPC .......... B60L 58/19; B60L 58/12; B60L 50/66; B62K 15/006; B62J 50/22

USPC ....................................................... 180/65.1
See application file for complete search history.

(56) References Cited

U.S. PATENT DOCUMENTS

| | | |
|---|---|---|
| 3,921,745 A | 11/1975 | Mcculloch et al. |
| 3,966,007 A | 6/1976 | Havener et al. |
| 4,280,581 A | 7/1981 | Rudwick |
| 5,237,263 A | 8/1993 | Gannon |
| 5,489,002 A | 2/1996 | Streiff |
| 5,848,660 A | 12/1998 | McGreen |

(Continued)

FOREIGN PATENT DOCUMENTS

| | | |
|---|---|---|
| CA | 2310974 C | 2/2002 |
| CN | 2936891 Y | 8/2007 |

(Continued)

OTHER PUBLICATIONS

"Can you bring an electric scooter on a plane? (every airline policy checked)," by Trajkovski, Matt, EScooterNerds, https://escooternerds.com/can-you-bring-an-electric-scooter-on-a-plane/, archived on Jul. 3, 2022 by Internet Archive Wayback Machine, https://web.archive.org/web/20220703114342/ https://escooternerds.com/can-you-bring-an-electric-scooter-on-a-plane/, accessed Jun. 21, 2023.

(Continued)

*Primary Examiner* — Hau V Phan

(57) ABSTRACT

Motorized vehicles include a deck, a motor mounted to the deck, a first battery connection point configured to releasably secure a first battery thereto, a second battery connection point configured to releasably secure a second battery thereto, and power circuitry. Power circuitry is configured to power the motor using the first battery and the second battery. The first battery and the second battery each have a charge capacity of about 160 watt hours.

30 Claims, 8 Drawing Sheets

(56) References Cited

U.S. PATENT DOCUMENTS

| | | | |
|---|---|---|---|
| 6,347,681 B1* | 2/2002 | Patmont | B62M 6/45 180/181 |
| RE37,583 E | 3/2002 | Mayer et al. | |
| 7,040,443 B1 | 5/2006 | Roth et al. | |
| RE45,897 E | 2/2016 | Naumann et al. | |
| 9,434,445 B1 | 9/2016 | Jauvtis | |
| 9,893,385 B1* | 2/2018 | Nayar | H01M 10/399 |
| 10,189,533 B2* | 1/2019 | Lovley, II | B62K 11/02 |
| 10,328,805 B1* | 6/2019 | Wyrobek | B60L 53/00 |
| 10,384,556 B1* | 8/2019 | Miyata | H01M 50/249 |
| 10,532,815 B1 | 1/2020 | Thrun et al. | |
| 11,345,426 B1 | 5/2022 | Agrawal et al. | |
| 2004/0013938 A1 | 1/2004 | Murashige et al. | |
| 2004/0026144 A1 | 2/2004 | Lan | |
| 2004/0088817 A1 | 5/2004 | Cochran et al. | |
| 2005/0177285 A1 | 8/2005 | Honda | |
| 2007/0251738 A1 | 11/2007 | Wachendorf et al. | |
| 2010/0078236 A1 | 4/2010 | Sasage et al. | |
| 2010/0096198 A1 | 4/2010 | Liao | |
| 2010/0206652 A1 | 8/2010 | Kielland | |
| 2011/0272203 A1 | 11/2011 | Sugimoto et al. | |
| 2012/0150377 A1 | 6/2012 | Buchheim et al. | |
| 2012/0234615 A1 | 9/2012 | Takamura et al. | |
| 2013/0153322 A1 | 6/2013 | Constin | |
| 2013/0233631 A1 | 9/2013 | Jauvtis | |
| 2013/0256049 A1 | 10/2013 | Matsuda | |
| 2014/0045367 A1 | 2/2014 | Christie et al. | |
| 2014/0111121 A1* | 4/2014 | Wu | B60L 50/40 318/139 |
| 2014/0366501 A1 | 12/2014 | Goto | |
| 2015/0122566 A1 | 5/2015 | Constien | |
| 2015/0158386 A1 | 6/2015 | Parienti | |
| 2015/0266543 A1 | 9/2015 | Marioni | |
| 2015/0333666 A1 | 11/2015 | Miller et al. | |
| 2015/0367911 A1 | 12/2015 | Chu et al. | |
| 2016/0020443 A1 | 1/2016 | White et al. | |
| 2016/0126533 A1 | 5/2016 | Velderman et al. | |
| 2016/0254506 A1 | 9/2016 | Nishihara et al. | |
| 2016/0272265 A1 | 9/2016 | Lovley, II et al. | |
| 2016/0272278 A1 | 9/2016 | Yamada | |
| 2016/0288875 A1 | 10/2016 | Fujiwara | |
| 2016/0336623 A1* | 11/2016 | Nayar | H02J 7/0068 |
| 2017/0021739 A1 | 1/2017 | Tsuji et al. | |
| 2017/0088157 A1 | 3/2017 | Young et al. | |
| 2017/0152000 A1 | 6/2017 | Chien et al. | |
| 2017/0174095 A1 | 6/2017 | Shieh | |
| 2017/0309874 A1 | 10/2017 | Hsia et al. | |
| 2018/0090797 A1 | 3/2018 | Huff et al. | |
| 2018/0151860 A1 | 5/2018 | David et al. | |
| 2018/0370371 A1 | 12/2018 | Ishikawa et al. | |
| 2019/0157641 A1 | 5/2019 | Koropachinsky et al. | |
| 2019/0238083 A1 | 8/2019 | White et al. | |
| 2019/0287190 A1 | 9/2019 | Tu et al. | |
| 2019/0312242 A1 | 10/2019 | Barton et al. | |
| 2019/0329660 A1 | 10/2019 | Shieh | |
| 2020/0009986 A1 | 1/2020 | Thrun et al. | |
| 2020/0047840 A1 | 2/2020 | Newby et al. | |
| 2020/0130771 A1 | 4/2020 | Jacobsz Rosier et al. | |
| 2020/0172245 A1 | 6/2020 | Thrun et al. | |
| 2020/0207442 A1 | 7/2020 | Ye | |
| 2020/0307792 A1 | 10/2020 | Thrun et al. | |
| 2020/0313249 A1* | 10/2020 | Zhao | G06Q 10/087 |
| 2020/0398694 A1 | 12/2020 | Treadway et al. | |
| 2020/0398931 A1 | 12/2020 | Talavasek et al. | |
| 2020/0411820 A1 | 12/2020 | Ye | |
| 2021/0016668 A1 | 1/2021 | Nakahara et al. | |
| 2021/0116911 A1 | 4/2021 | Pjevach | |
| 2021/0125499 A1* | 4/2021 | Cooper | G06Q 30/0645 |
| 2021/0152004 A1* | 5/2021 | Basehore | H02J 7/0071 |
| 2021/0316621 A1* | 10/2021 | Slepchenkov | B60L 53/14 |
| 2021/0369539 A1 | 12/2021 | Campbell et al. | |
| 2022/0006959 A1 | 1/2022 | Chen et al. | |
| 2022/0048402 A1 | 2/2022 | Desberg et al. | |
| 2022/0169144 A1 | 6/2022 | Kai | |
| 2022/0185407 A1 | 6/2022 | Chang et al. | |
| 2022/0194511 A1 | 6/2022 | French et al. | |
| 2022/0227445 A1 | 7/2022 | Guo et al. | |
| 2022/0266946 A1 | 8/2022 | Hancock et al. | |
| 2022/0329081 A1 | 10/2022 | Bentzion | |
| 2023/0067597 A1 | 3/2023 | Dodman | |
| 2023/0068251 A1 | 3/2023 | Dodman | |

FOREIGN PATENT DOCUMENTS

| | | |
|---|---|---|
| CN | 200945896 Y | 9/2007 |
| CN | 202827977 U | 3/2013 |
| CN | 106328842 A | 1/2017 |
| CN | 217100328 U | 8/2022 |
| DE | 9403583 U1 | 6/1995 |
| DE | 202014005762 U1 | 10/2014 |
| DE | 202018001017 U1 | 9/2018 |
| EP | 0716009 A2 | 6/1996 |
| EP | 1097863 A2 | 11/2000 |
| EP | 2386474 A1 | 11/2011 |
| EP | 2586686 A1 | 5/2013 |
| EP | 2781446 A1 | 9/2014 |
| EP | 3103712 A1 | 12/2016 |
| EP | 3216687 A1 | 9/2017 |
| EP | 3756986 A1 | 12/2020 |
| EP | 3815959 A1 | 5/2021 |
| FR | 3076539 A1 | 7/2019 |
| FR | 3076682 A1 | 7/2019 |
| IN | 201741002830 A | 7/2018 |
| JP | H06-48365 A | 2/1994 |
| JP | H08-207877 A | 8/1996 |
| JP | H09-24889 A | 1/1997 |
| JP | H09-226664 A | 9/1997 |
| JP | H10-119853 A | 5/1998 |
| JP | H11-129959 A | 5/1999 |
| JP | 2001-247069 A | 9/2001 |
| JP | 2002-321675 A | 11/2002 |
| JP | 2003-34281 A | 2/2003 |
| JP | 2007-112406 A | 5/2007 |
| JP | 2013-164979 A | 8/2013 |
| JP | 2017-165414 A | 9/2017 |
| JP | 2019-111906 A | 7/2019 |
| JP | 2021-77448 A | 5/2021 |
| KR | 102202878 B1 | 1/2021 |
| NL | 2000965 C1 | 12/2008 |
| WO | WO 93/17904 A1 | 9/1993 |
| WO | WO 2010/121482 A1 | 10/2010 |
| WO | WO 2014/119130 A1 | 8/2014 |
| WO | WO 2014/154295 A1 | 10/2014 |
| WO | WO 2016/184613 A1 | 11/2016 |
| WO | WO 2019/121418 A1 | 6/2019 |
| WO | WO 2019/201300 A1 | 10/2019 |
| WO | WO 2020/008132 A1 | 1/2020 |
| WO | WO 2020/111915 A2 | 6/2020 |
| WO | WO 2020/153477 A1 | 7/2020 |
| WO | WO 2021/084313 A1 | 5/2021 |
| WO | WO 2022/128874 A1 | 6/2022 |
| WO | WO 2022/150288 A1 | 7/2022 |
| WO | WO 2022/150303 A1 | 7/2022 |
| WO | WO 2022/157081 A1 | 7/2022 |
| WO | WO 2022/129149 A2 | 8/2022 |
| WO | WO 2022/161970 A1 | 8/2022 |
| WO | WO 2022/168791 A1 | 8/2022 |
| WO | WO 2022/172998 A1 | 8/2022 |
| WO | WO 2022/175501 A1 | 8/2022 |
| WO | WO 2022/177941 A2 | 8/2022 |
| WO | WO 2022/179844 A1 | 9/2022 |
| WO | WO 2022/192600 A1 | 9/2022 |
| WO | WO 2022/200892 A1 | 9/2022 |
| WO | WO 2022/200907 A1 | 9/2022 |
| WO | WO 2022/219456 A1 | 10/2022 |
| WO | WO 2022/221648 A1 | 10/2022 |
| WO | WO 2022/224238 A1 | 10/2022 |
| WO | WO 2022/230965 A1 | 11/2022 |

(56) References Cited

FOREIGN PATENT DOCUMENTS

| WO | WO 2023/069414 A1 | 4/2023 |
|---|---|---|
| WO | WO 2023/111599 A1 | 6/2023 |

OTHER PUBLICATIONS

"Technical Guide: Electric Scooter Batteries," by Justin, Electric Scooter Guide, https://electric-scooter.guide/guides/electric-scooter-batteries/, archived on Jul. 20, 2022 by Internet Archive Wayback Machine, https://web.archive.org/web/20220720190638/https://electric-scooter.guide/guides/electric-scooter-batteries/, accessed Jun. 21, 2023.

"Comprehensive Guide to Electric Scooter Batteries (Must-Know Bits, Tips, Hacks)," by Trajkovski, Matt, EScooterNerds, https://escooternerds.com/electric-scooter-batteries/, archived on Jul. 10, 2022 by Internet Archive Wayback Machine, https://web.archive.org/web/20220703120252/https://escooternerds.com/electric-scooter-batteries/, accessed Jun. 21, 2023.

"V8 Dual-Battery Electric Scooter," TurboAnt, https://turboant.com/products/v8-dual-battery-electric-scooter, archived on Jul. 12, 2022 by Internet Archive Wayback Machine, https://web.archive.org/web/20220712032044/https://turboant.com/products/v8-dual-battery-electric-scooter, accessed Jun. 21, 2023.

"Electric Scooter Battery—The Guide You Need to Know," TurboAnt, https://turboant.com/blogs/guides/electric-scooter-battery, archived on Aug. 30, 2022 by Internet Archive Wayback Machine, https://web.archive.org/web/20220830164659/https://turboant.com/blogs/guides/electric-scooter-battery, accessed Jun. 21, 2023.

"BQi-C3 Pro" Product Page, Niu International, https://www.niu.com/US/product/bqi-c3, archived on Sep. 27, 2022 by Internet Archive Wayback Machine, https://web.archive.org/web/20220927105800/https://www.niu.com/US/product/bgi-c3, accessed Jun. 22, 2023.

"JackRabbit—Black—JackRabbit eBike" Product Page, JackRabbit Mobility Inc., https://jackrabbit.bike/products/jackrabbit?variant=41475026583720, archived on Jul. 14, 2022 by Internet Archive Wayback Machine, https://web.archive.org/web/20220808022839/https://jackrabbit.bike/products/jackrabbit?variant=41475026583720, accessed Jun. 22, 2023.

"JackRabbit eBike" Website, JackRabbit Mobility Inc., https://jackrabbit.bike/, archived on Aug. 14, 2022 by Internet Archive Wayback Machine, https://web.archive.org/web/20220814001903/https://jackrabbit.bike/, accessed Jun. 22, 2023.

"Air-Sea-Land Travel Bag - JackRabbit eBike" Product Page, JackRabbit Mobility Inc., https://jackrabbit.bike/collections/accessories/products/air-sea-land-travel-bag?variant=41475194519720, archived on Jun. 25, 2022 by Internet Archive Wayback Machine, https://web.archive.org/web/20220625021914/https://jackrabbit.bike/collections/accessories/products/air-sea-land-travel-bag?variant=41475194519720, accessed Jun. 22, 2023.

"SmartScoot™—The Foldable Mobility Scooter" Website, ASP Global, https://www.smartscoot.com/, archived on Jul. 1, 2022 by Internet Archive Wayback Machine, https://web.archive.org/web/20220701010112/https://www.smartscoot.com/, accessed Jun. 22, 2023.

"Traveling With Mobile Scooters—Airline & FAA Guidance," ASP Global, https://www.smartscoot.com/faa-airline-travel-mobile-scooter/, archived on May 17, 2022 by Internet Archive Wayback Machine, https://web.archive.org/web/20220517131953/https://www.smartscoot.com/faa-airline-travel-mobile-scooter/, accessed Jun. 22, 2023.

"Can I fly with the SmartScoot™ electric travel scooter?," ASP Global, https://www.smartscoot.com/can-i-fly-with-the-smartscoot-electric-travel-scooter/, archived on May 17, 2022 by Internet Archive Wayback Machine, https://web.archive.org/web/20220517141304/https://www.smartscoot.com/can-i-fly-with-the-smartscoot-electric-travel-scooter/, accessed Jun. 22, 2023.

"SmartScoot Foldable Mobility Scooter—Specifications," ASP Global, https://www.smartscoot.com/foldable-mobility-scooter-specifications/, archived on May 17, 2022 by Internet Archive Wayback Machine, https://web.archive.org/web/20220517150627/https://www.smartscoot.com/foldable-mobility-scooter-specifications/, accessed Jun. 22, 2023.

"ATTO Mobility Scooter" Product Page, Moving Life Ltd., https://www.movinglife.com/products/atto-mobility-scooter, archived on Aug. 9, 2022 by Internet Archive Wayback Machine, https://web.archive.org/web/20220809041620/https://www.movinglife.com/products/atto-mobility-scooter, accessed Jun. 22, 2023.

"Top Tips for Flying With a Mobility Scooter," Moving Life Ltd., https://www.movinglife.com/blogs/travel-with-atto/top-tips-for-flying-with-a-mobility-scooter, dated Oct. 25, 2020, archived on Jul. 3, 2022 by Internet Archive Wayback Machine, https://web.archive.org/web/20220703062334/https://www.movinglife.com/blogs/travel-with-atto/top-tips-for-flying-with-a-mobility-scooter, accessed Jun. 22, 2023.

"ATTO Mobility Scooter—Flight Safety Certificates," Moving Life Ltd., https://cdn.shopify.com/s/files/1/0507/5710/7909/files/Movinglife_battery_Ver3.7.pdf, dated 2017, accessed Jun. 22, 2023.

* cited by examiner

US 11,850,969 B1

PORTABLE MOTORIZED VEHICLES

CROSS-REFERENCE TO RELATED APPLICATIONS

This application is a continuation of International patent application no. PCT/US23/25629, filed Jun. 16, 2023, which claims priority to U.S. provisional application No. 63/400,128, filed Aug. 23, 2022, each of which is incorporated by reference herein in its entirety.

BACKGROUND

Field

The disclosed subject matter relates to motorized vehicles, including such vehicles that can be packed for long-distance transportation such as air transportation.

Description of Related Art

Motorized vehicles can be used for personal or small group transportation, such as scooters, bicycles, folding bicycles, motorcycles, three-wheel scooters (trikes), folding tricycles, hoverboards (sometimes referred to as self-balancing scooters), handlebar scooters, kick scooters, off-road scooters, skateboards, unicycles (sometimes referred to as eWheels), single-wheel boards, enclosed bicycles, or four-wheel carts (e.g., golf carts). Such motorized vehicles can be moved by motors powered from a variety of sources, including but not limited to electric, gas, steam, water, hydrogen, or nuclear.

However, transporting such motorized vehicles can be impractical for most people. For example, when traveling by a long-distance vehicle, including but not limited to air travel, packing many such motorized vehicles can be prohibited. Motorized vehicles can thus be rented at many travel destinations, which if available at all can be costly. Some cities offer programs for renting or sharing motorized vehicles, such as electric scooters or bikes, which can be a more economical option, but such programs are not widespread, may only be practical in urban areas or popular tourist destinations, and can involve the user having different accounts at each location, which can be time consuming to set up and manage.

Electric vehicles, including so-called micro-mobility vehicles such as electric scooters or electric bikes, which can be relatively lightweight and portable, can be subject to restrictions limiting or prohibiting such vehicles from being packed for transportation. For example and without limitation, airlines or airline regulators can have size restrictions and/or restrictions on batteries or other power sources for motorized vehicles that can be packed in carry-on or checked luggage on airplanes. Motorized vehicles that meet these restrictions are often underpowered and/or have an undesirable range. Accordingly, there is an opportunity for motorized vehicles and related kits that can be packed for long-distance transportation and have improved power and/or range. There are also opportunities for motorized vehicles having improved power management features which, for example and without limitation, can be beneficial for motorized vehicles configured for long-distance transportation.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the devices, methods and kits particularly pointed out in the written description and claims hereof, as well as from the drawings.

To achieve these and other advantages and in accordance with the purpose of the disclosed subject matter, as embodied and broadly described, the disclosed subject matter includes a motorized vehicle having a deck, a motor mounted to the deck, a first battery connection point configured to releasably secure a first battery thereto, a second battery connection point configured to releasably secure a second battery thereto, and power circuitry configured to power the motor using the first battery and the second battery. As embodied herein, the first battery and the second battery each has a charge capacity of about 160 Wh.

Additionally or alternatively, as embodied herein, the first battery connection point and the second battery connection point can be configured to dispose the first and second batteries on opposing sides of a longitudinal axis of the deck. As embodied herein, the first battery connection point and the second battery connection point can be configured to dispose the first and second batteries along or parallel to a longitudinal axis of the deck.

Furthermore, or as an alternative, the motorized vehicle can include a drivetrain operably connecting the motor to a first wheel. The first battery connection point and the second battery connection point can be configured to dispose the first and second batteries on opposing sides of a longitudinal axis of the drivetrain. As embodied herein, the first battery connection point and the second battery connection point can be configured to dispose the first and second batteries along or parallel to a longitudinal axis of the drivetrain.

In addition, or as a further alternative, the first battery connection point can be disposed in a first frame component, and the second battery connection point can be disposed in a second frame component and aligned at an oblique angle relative to the first battery connection point. As embodied herein, the first battery connection point and the second battery connection point can be disposed in the same frame component in a substantially parallel alignment, and can be disposed along opposing sides of the frame component.

As embodied herein, the power circuitry can be configured to power the motor using the first battery in a series configuration with the second battery. The power circuitry can configured to power the motor using the first battery in a parallel configuration with the second battery.

Additionally or alternatively, as embodied herein, the power circuitry can be configured to switch the first battery between a series configuration and a parallel configuration with the second battery. The motorized vehicle can include a user interface configured to allow selection between the series configuration and the parallel configuration. As embodied herein, the power circuitry can be configured to automatically switch between the series configuration and the parallel configuration based on a charge level of the first battery or the second battery, when the parallel configuration is sufficient to power the vehicle to maintain a desired speed, when the parallel configuration is insufficient to power the vehicle to maintain a desired speed, and/or based on one or more measured factors, which can include a speed of the vehicle, an acceleration of the vehicle, a change in elevation of the vehicle, a change in terrain conditions, a change in weather conditions, or a change in visibility.

Furthermore, or as an alternative, the power circuitry can configured to switch to a single battery mode selecting one of the first battery or the second battery to power the motor. The motorized vehicle can include a user interface configured to allow selection of the single battery mode. As embodied herein, the power circuitry can be configured to automatically select the single battery mode based on a condition of the first battery or the second battery, based on an absence of the first battery or the second battery, and/or to preserve the first battery or the second battery when the other one of the first battery or the second battery is sufficient to power the vehicle to maintain a desired speed. In addition, or as a further alternative, the first and second batteries each can be rechargeable lithium ion batteries.

As embodied herein, the motorized vehicle is moveable between a riding configuration and a storage configuration. The motorized vehicle can include a steering control extending outwardly from the deck in the riding configuration. The steering control can be configured to be moved substantially parallel with the deck in the storage configuration. The steering control can be configured to be moved proximate the deck in the storage configuration. Additionally or alternatively, as embodied herein, the motorized vehicle can include a seat extending outwardly from the deck in the riding configuration. The seat can be configured to be moved proximate the deck in the storage configuration. Furthermore, or as an alternative, the motorized vehicle can include at least one frame component movable about a hinged portion from the riding configuration to the storage configuration.

In addition, or as a further alternative, the motorized vehicle can be configured as an electric scooter. As embodied herein, the motorized vehicle can be configured as an electric bicycle.

It is to be understood that both the foregoing general description and the following detailed description are exemplary and are intended to provide further explanation of the disclosed subject matter.

The accompanying drawings, which are incorporated in and constitute part of this specification, are included to illustrate and provide a further understanding of the methods and systems of the disclosed subject matter. Together with the description, the drawings explain the principles of the disclosed subject matter.

BRIEF DESCRIPTION OF THE DRAWINGS

The details of the subject matter set forth herein, both as to its structure and operation, may be apparent by study of the accompanying figures, in which like reference numerals refer to like parts.

DETAILED DESCRIPTION

Figure 1:
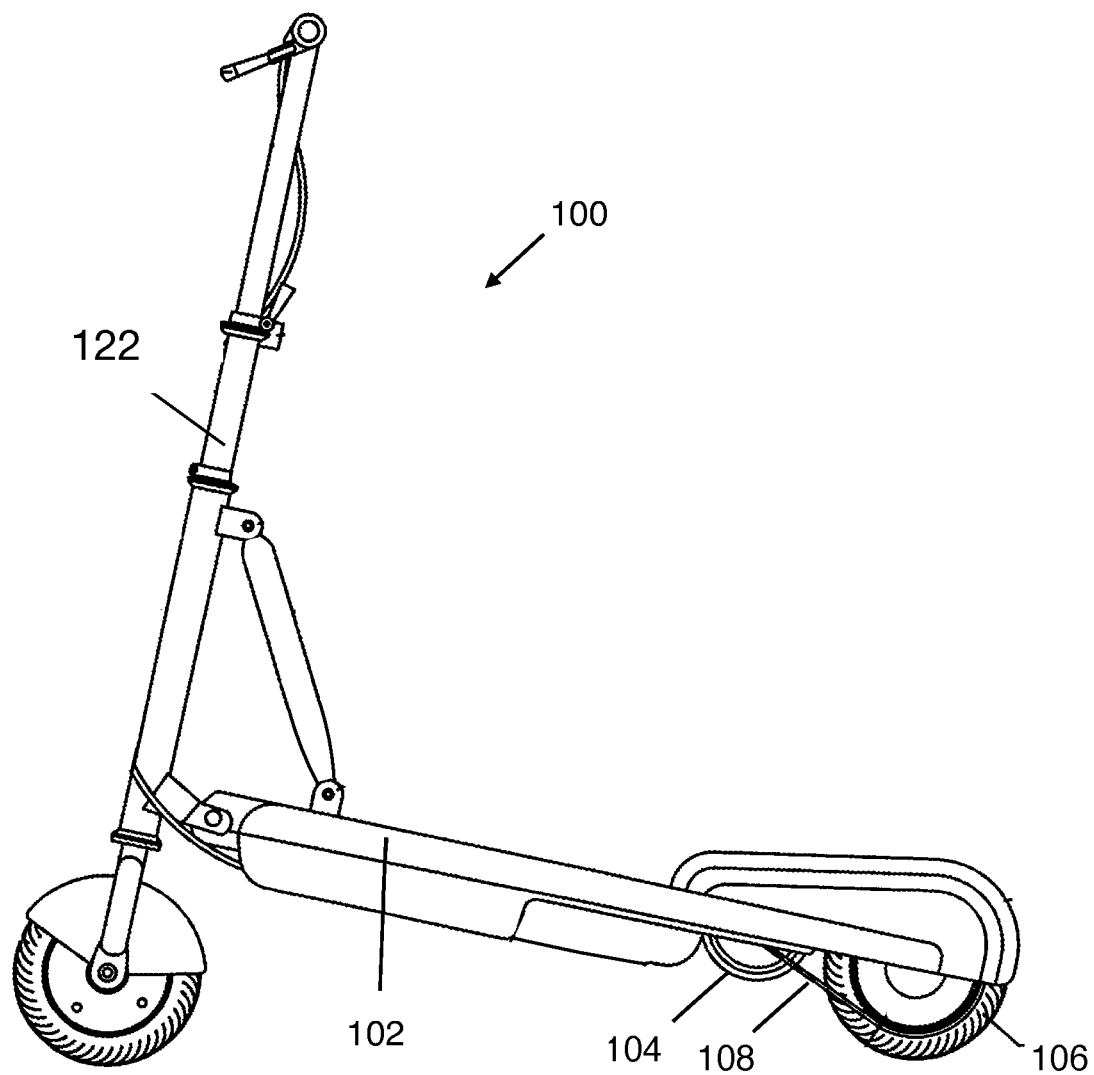
FIG. 1 is a side view of an exemplary motorized vehicle configured as an electric scooter in accordance with the disclosed subject matter in a riding configuration.

Reference will now be made in detail to the various exemplary embodiments of the disclosed subject matter, exemplary embodiments of which are illustrated in the accompanying drawings. The structure and corresponding method of operation of the disclosed subject matter will be described in conjunction with the detailed description of the system.

The devices, methods and kits presented herein may be used for motorized transport of a person or small group of people. Motorized vehicles disclosed herein are particularly suited for packing for transportation by a rider of the motorized vehicle, including having first and second connection points to releasably secure first and second batteries to the vehicle to power a motor.

In accordance with the disclosed subject matter herein, the motorized vehicle generally includes a deck, a motor mounted to the deck, a first battery connection point configured to releasably secure a first battery thereto, a second battery connection point configured to releasably secure a second battery thereto, and power circuitry. As embodied herein, the power circuitry is configured to power the motor using the first battery and the second battery. Moreover, as embodied herein, the first battery and the second battery each has a charge capacity of about 160 watt hours.

As used herein, the term "about" refers to a degree of deviation based on experimental error typical for the particular property identified. The latitude for the degree of deviation provided the term "about" will depend on the specific context and particular property and can be readily discerned by those skilled in the art. The term "about" is not intended to either expand or limit the degree of equivalents which may otherwise be afforded a particular value. Further, the term "about" includes "exactly" the amount or range recited.

The accompanying figures, where like reference numerals refer to identical or functionally similar elements throughout the separate views, serve to further illustrate various embodiments and to explain various principles and advantages all in accordance with the disclosed subject matter. For purpose of explanation and illustration, and not limitation, exemplary embodiments of motorized vehicles and related kits in accordance with the disclosed subject matter are shown in FIGS. 1-12. The motorized vehicles described herein are suitable for use as personal or small group transportation, and can be configured as scooters, bicycles, folding bicycles, motorcycles, three-wheel scooters (trikes), folding tricycles, hoverboards (sometimes referred to as self-balancing scooters), handlebar scooters, kick scooters, off-road scooters, skateboards, unicycles (sometimes referred to as eWheels), single-wheel boards, enclosed bicycles or four-wheel carts (e.g., golf carts). Motorized vehicles in accordance with the disclosed subject matter can be moved by motors powered from a variety of sources, including but not limited to electric, gas, steam, water, hydrogen, or nuclear. However, motorized vehicles disclosed herein are particularly suitable and beneficial for use with electric motors, which desirably can have first and second connection points to releasably secure first and second batteries to the vehicle to power a motor, which can allow for packing, storing and/or transporting of the motorized vehicle separate from the first and second batteries. Further, motorized vehicles desirably can be moved between a riding configuration, suitable to allow a rider or group of riders to ride thereon, and a storage configuration, used for packing, storing, and/or transporting such motorized vehicles for relatively longer distance transportation, such as but not limited to air transportation.

Figure 2:
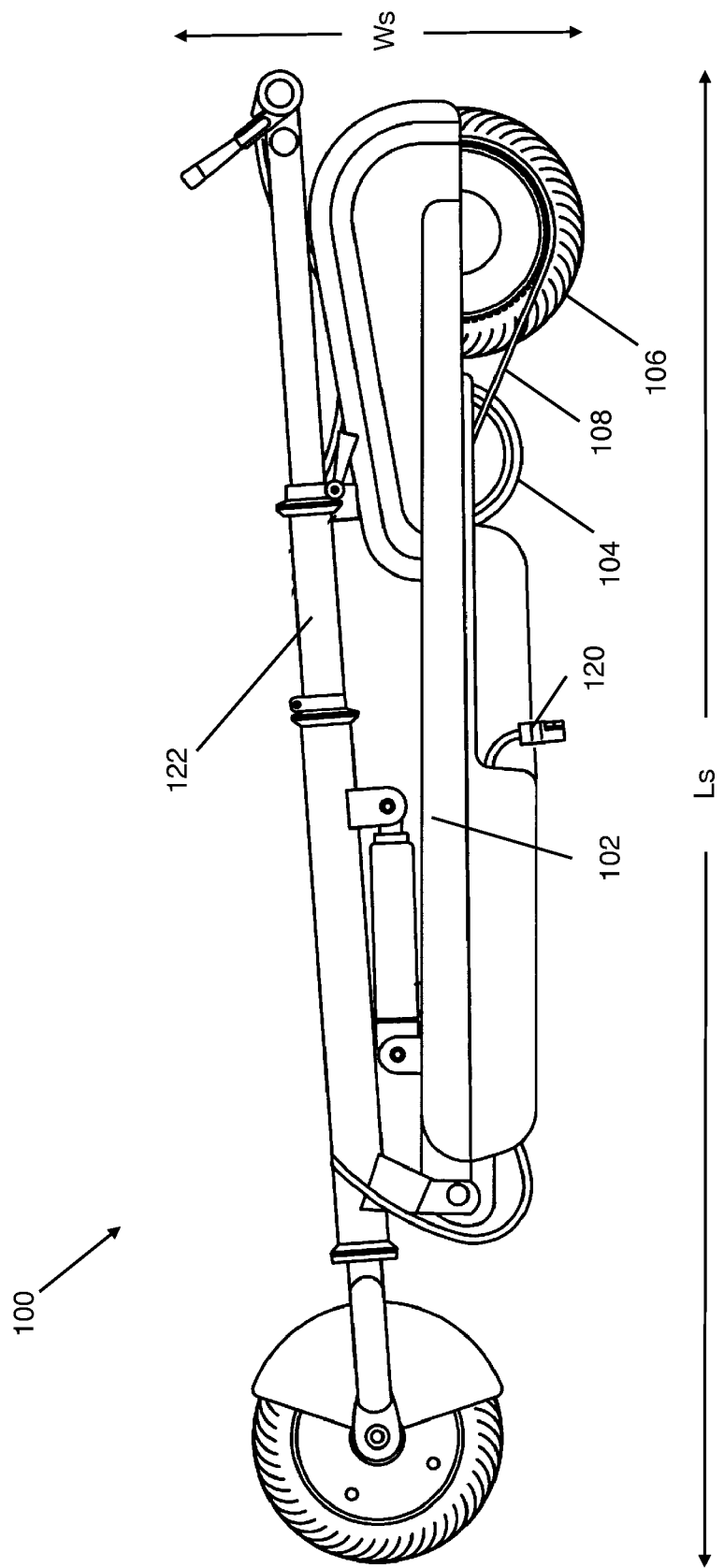
FIG. 2 is a side view the motorized vehicle of FIG. 1 in a storage configuration.
Figure 3:
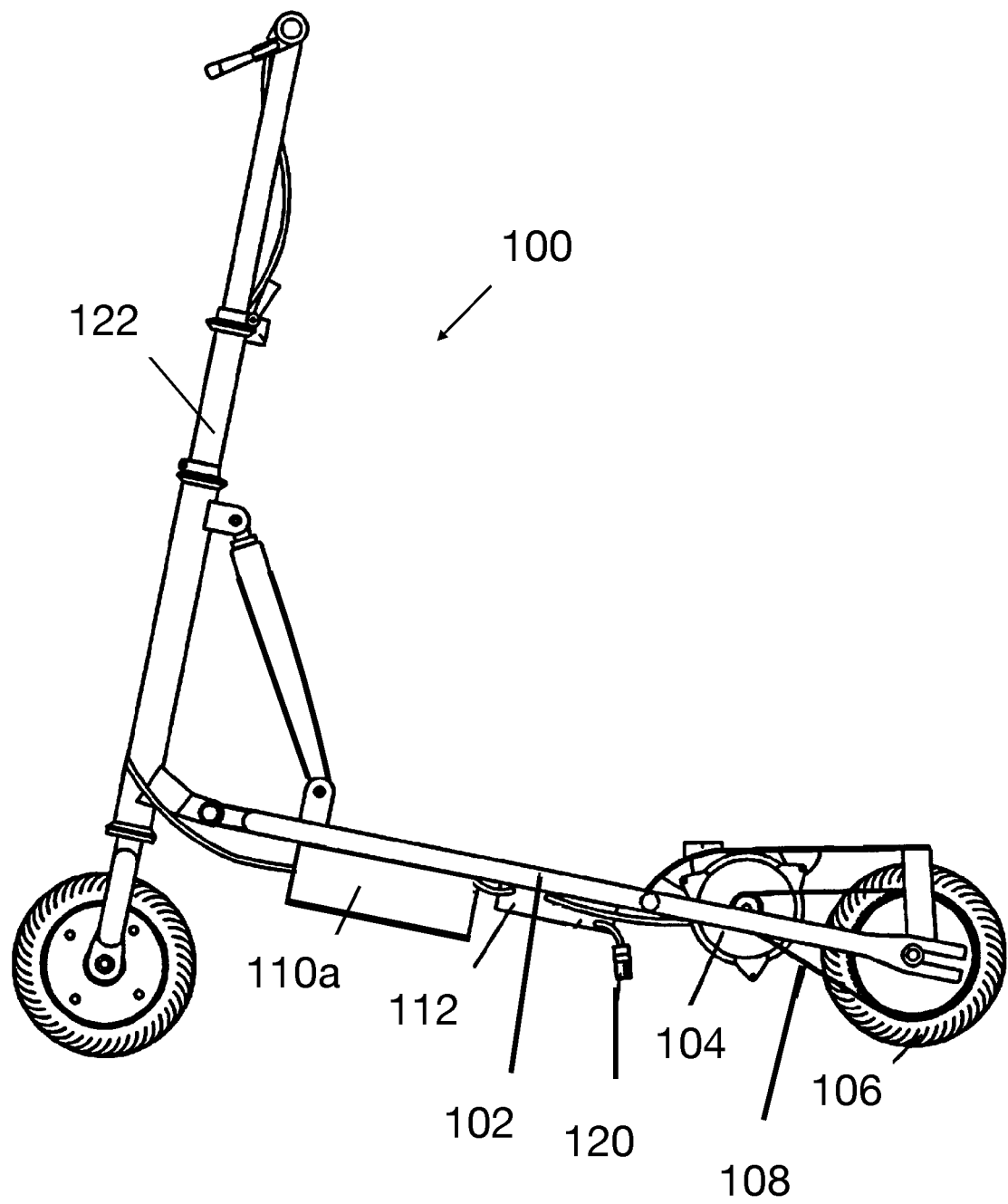
FIG. 3 is a side view of the motorized vehicle of FIG. 1 in the riding configuration with batteries and housing portions removed to show additional components in accordance with the disclosed subject matter.

For purpose of illustration, and not limitation, reference is made to the exemplary embodiments of motorized vehicles shown in FIGS. 1-11. As shown in FIGS. 1-3, a motorized vehicle 100 is configured as an electric scooter and generally includes a deck 102 having a flat or substantially flat upper portion to allow a rider (or group of riders) on the deck 102 to ride motorized vehicle 100 in a standing position or seated if seats (not shown) are provided. Deck 102 can be formed from any suitable material, which can be lightweight and durable, including but not limited to plastic, aluminum, metal or other suitable materials.

Referring still to FIGS. 1-3, a motorized vehicle 100 includes a motor 104, which can be an electric motor and can be mounted to deck 102. The motor 104 can be electrically connected to a power system and can be operably connected to wheel 106 by a drivetrain 108, which can be configured as a drive belt, rotor, transmission or any other suitable mechanism to transmit power from the motor 104 to a wheel 106. Wheel 106 can be disposed proximate an end of the deck 102, or can be disposed proximate an interior portion of the deck 102, where deck 102 can include one or more cutouts or apertures to accommodate the wheel 106 or can secure the wheel 106 to the deck 102 by a wheel mount.

With continued reference to FIGS. 1-3, motorized vehicle 100 includes a battery connection point 110a configured to releasably secure a battery thereto. Battery connection point 110a can include any suitable mechanism to releasably secure a battery, including a snap-fit mechanism, interlocking hooks, locking clips, hook and pile fabric, magnetic coupling, or any other suitable mechanism to secure a battery to battery connection point 110a.

Referring still to FIGS. 1-3, motorized vehicle 100 can be moveable from a riding configuration, as shown for example in FIG. 1, to a storage configuration, as shown for example in FIG. 2. Motorized vehicle 100 can further include a steering control, for example as part of steering column 122 extending outwardly from the deck in the riding configuration. Steering column 122 can include a steering control component, such as a steering wheel or handle bars. Steering column 122 can also include one or more shock absorbers or dampers for energy dissipation, for example in the event of a collision, and can provide mounting for one or more components or accessories, including but not limited to, one or more control switches, a column lock, column wiring, throttle, gear selector, gauges, sensors, or other instruments. Steering column 122 can also include a length or height adjustment, such as by a telescoping rod mechanism, to allow the rider to adjust the length or height of the steering column 122 to suit rider size or preference. As shown in FIGS. 1-2, for example and not limitation, steering control 122 can be configured to be moved proximate and/or into substantially parallel alignment with deck 102 in the storage configuration.

For purpose of illustration and not limitation, referring still to FIGS. 1-2, and as embodied herein, motorized vehicle 100 is configured to have a hinged portion, such as steering control 122, that can fold, pivot, flex or otherwise collapse into the storage configuration. As shown for example in FIG. 2, in the storage configuration, motorized vehicle 100 can have a longest dimension Ls and a second dimension Ws extending from Ls. For example and as embodied herein, in the storage configuration, motorized vehicle 100 can be configured for long-distance transportation, such as air transportation. For purpose of illustration and not limitation, as embodied herein, motorized vehicle 100 in the storage configuration can have one or more dimensions suitable for transportation in or as checked luggage on long-distance transportation. For example and without limitation, as embodied herein, Ls can be less than about 35 in. (90 cm), 55 in. (140 cm), 59 in. (150 cm), 62 in. (158 cm), 80 in. (203 cm), or 118 in. (300 cm) to be within airline requirements for checked luggage size, which can vary by airline, class of service, destination, length or distance of trip, or other factors. Additionally or alternatively, motorized vehicle 100 in the storage configuration can have one or more dimensions suitable for transportation in or as carry-on luggage on long-distance transportation. For example and without limitation, as embodied herein, Ls can be less than about 16 in. (40 cm), 17 in. (43 cm), 18 in. (46 cm), 21 in. (53 cm), 22 in. (56 cm) or 24 in. (60 cm), and as embodied herein, Ws can be less than about 10 in. (25 cm), 13 in. (33 cm), 14 in. (36 cm), 15 in. (38 cm), 16 in. (40 cm), or 18 in. (46 cm) to be within airline requirements for carry-on luggage size or personal item size, each of which can also vary by airline, class of service, destination, length or distance of trip, or other factors. As described further herein, motorized vehicle 100 can be configured to be transported separately from batteries 114a, 114b, for example and without limitation in or as a checked luggage, in or as a separate carry-on luggage or personal item, or in separate spaces or compartments of a carry-on luggage or personal item.

As embodied herein, deck 102 can include one or more seats, which for example and without limitation can extend outwardly substantially perpendicular to the horizontal axis of deck 102 and/or substantially parallel with steering column 122. Seats if provided can also be configured to move proximate and/or into substantially parallel alignment with the remainder of deck 102 and/or steering column 122 in the storage configuration as described herein, for example and as embodied herein by being configured to fold, pivot, flex or otherwise collapse into the storage configuration. Additionally or alternatively, as embodied herein, battery connection points 110a, 110b can extend outwardly from deck 102 in the riding configuration and can be collapsible inward toward deck 102 in the storage configuration. In addition or as a further alternative, battery connection point 110*a* can include a housing which can be waterproof when in the riding configuration with the batteries secured therein. Motorized vehicle 100 can include a charging cable 120 thereon, or alternatively a receptacle for a charging cable, to allow batteries to be charged when disposed in battery connection point 110*a*. Additional features of motorized vehicles, which can be implemented on or for use with the motorized vehicles herein, are described in U.S. Pat. No. 5,848,660, which is incorporated by reference herein in its entirety.

As embodied herein, as shown in FIGS. 1-3, motorized vehicle 100 includes power circuitry 112 configured to power motor 104. Battery connection point 110*a* can include an electrical connector, which can be a physical contact (e.g., wired) connection or a wireless power connection, to electrically couple a battery to power circuitry 112 when releasably secured to battery connection point 110*a*. Battery connection point 110*a* can be a first battery connection point, and a second battery connection point can be disposed elsewhere to releasably secure a second battery thereto as described further herein. For example and without limitation, as embodied herein, battery connection point 110*b* can be disposed on the opposite side of deck 102 from battery connection point 110*a*, as shown for example in FIG. 4. In this manner, the first and second batteries each is separately attachable to motorized vehicle 100. Additionally or alternatively, the first and second batteries can be configured to be separately attachable to each other. For example, as embodied herein, battery connection point 110*a* and battery connection point 110*b* can be disposed proximate each other such that first and second batteries are physically connected when inserted therein. Alternatively, battery connection point 110*a* and battery connection point 110*b* can be disposed spaced apart such that first and second batteries are physically separate and spaced apart along deck 102. As a further alternative, battery connection point 110*b* can be disposed on one or both of the first and second batteries, such that one of the first and second batteries can be connected to motorized vehicle 100 via the other one of the first and second batteries having a battery connection point 110*b*, for example and not limitation as a "daisy-chain" configuration. As embodied herein, first battery and second battery can have a substantially similar area as battery connection point 110*a* and battery connection point 110*b*, respectively.

Figure 4:
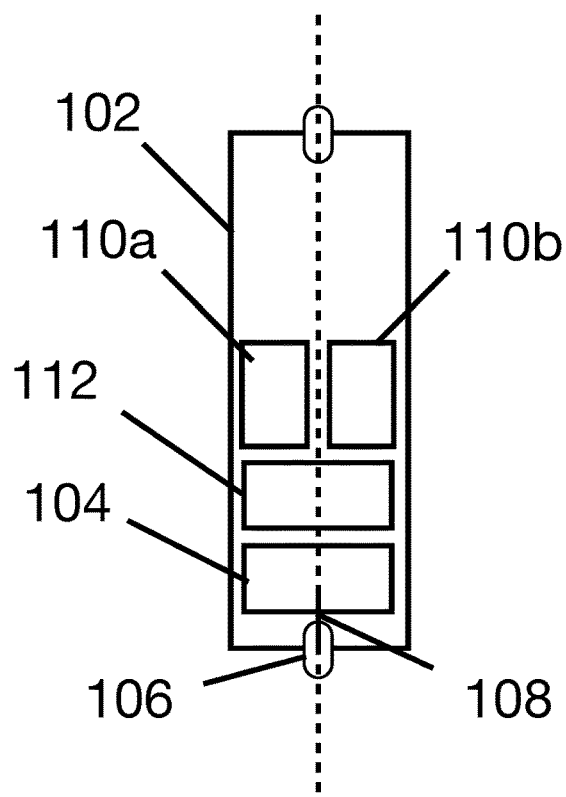
FIG. 4 is a diagram illustrating an embodiment of an exemplary motorized vehicle in the riding configuration having first and second batteries in accordance with the disclosed subject matter.

For purpose of illustration only, and not limitation, battery connection point 110*b* can have a similar configuration as battery connection point 110*a*. As such, battery connection point 110*b* can include an electrical connector to electrically couple a second battery to power circuitry 112. As described herein, power circuitry 112 can be configured to power the motor 104 using the first battery and the second battery. As shown in FIG. 4, as embodied herein, battery connection point 110*a* and battery connection point 110*b* can be configured to dispose the first and second batteries on opposing sides of a longitudinal axis of deck 102. Additionally or alternatively, battery connection point 110*a* and battery connection point 110*b* can be configured to dispose the first and second batteries on opposing sides of a longitudinal axis of drivetrain 108. Different configurations of the battery connection points 110*a*, 110*b* can distribute the weight of the first and second batteries differently depending on the desired movement and steering characteristics desired. For example, the configurations of FIG. 4 can distribute more weight toward the center or toward an end of the deck 102, which can allow the opposite end to move more freely.

Figure 5:
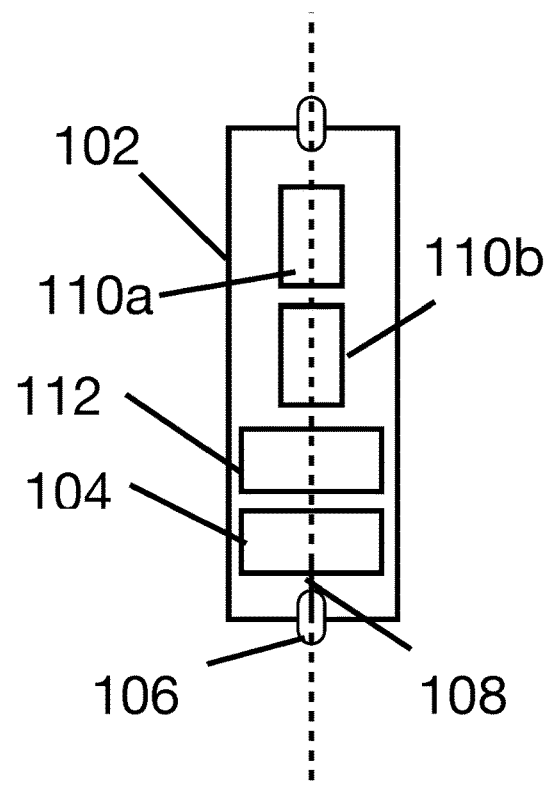
FIG. 5 is a diagram illustrating another embodiment of an exemplary motorized vehicle in the riding configuration having first and second batteries in accordance with the disclosed subject matter.
Figure 6:
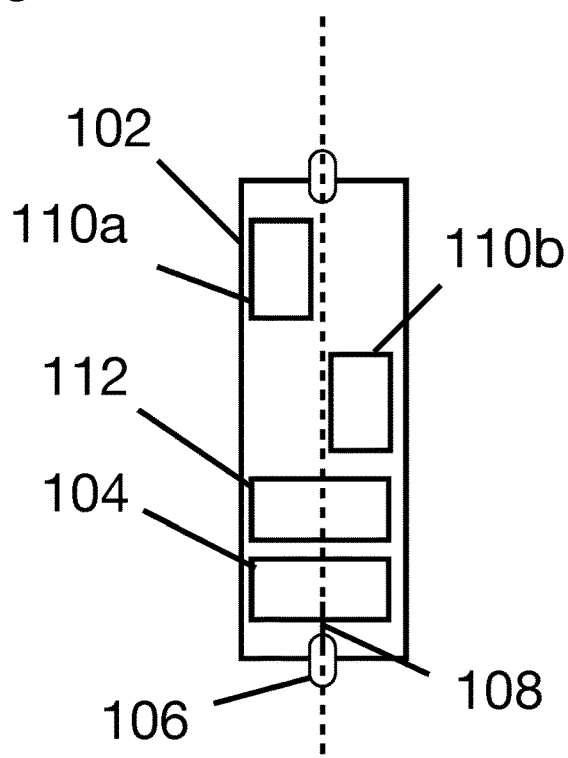
FIG. 6 is a diagram illustrating another embodiment of an exemplary motorized vehicle in the riding configuration having first and second batteries in accordance with the disclosed subject matter.

Additionally or alternatively, as shown in FIG. 5, battery connection point 110*a* and battery connection point 110*b* can be configured to dispose first and second batteries along a longitudinal axis of deck 102, or alternatively, can dispose first and second batteries parallel or substantially parallel to the longitudinal axis of deck 102. As a further alternative, battery connection point 110*a* and battery connection point 110*b* can be configured to dispose first and second batteries along a longitudinal axis of drivetrain 108, or alternatively, can dispose first and second batteries parallel or substantially parallel to the longitudinal axis of drivetrain 108. Such configurations can distribute the weight more evenly along the length of the deck 102, which can provide more balanced response. As a further alternative, as shown in FIG. 6, battery connection point 110*a* and battery connection point 110*b* can be configured to dispose first and second batteries in opposing corners of deck 102. This configuration can distribute the weight more evenly across the entirety of deck 102 and provide a wider base for more stability. In addition, or as a further alternative, one or more of battery connection points 110*a*, 110*b* can be placed in other directions relative the longitudinal surface of the deck 102, such as along a steering column 122 or along a seat extending from the deck 102, if provided. For example and not limitation, alternative embodiments of motorized vehicles having alternative battery connection point configurations are shown and described with reference to FIGS. 7A-7B.

Figure 7A:
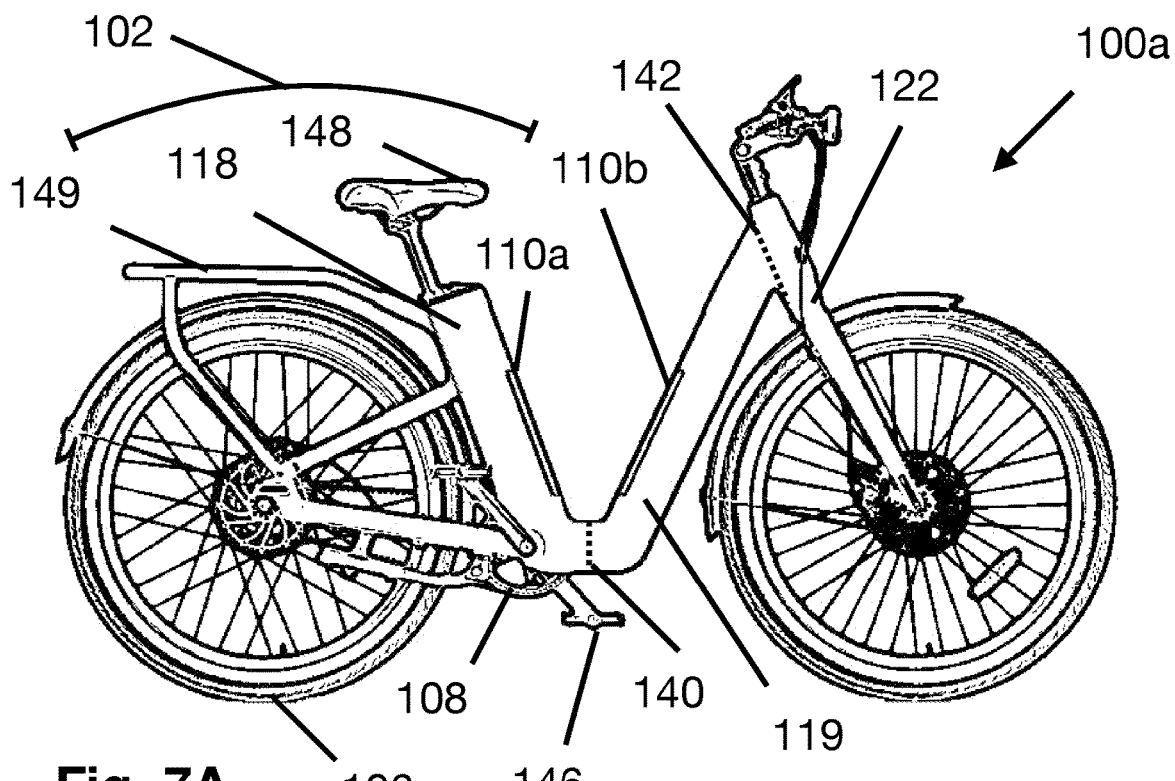
FIG. 7A is a side view of another embodiment of an exemplary motorized vehicle configured as an electric bike in a riding configuration and having first and second batteries in accordance with the disclosed subject matter.
Figure 7B:
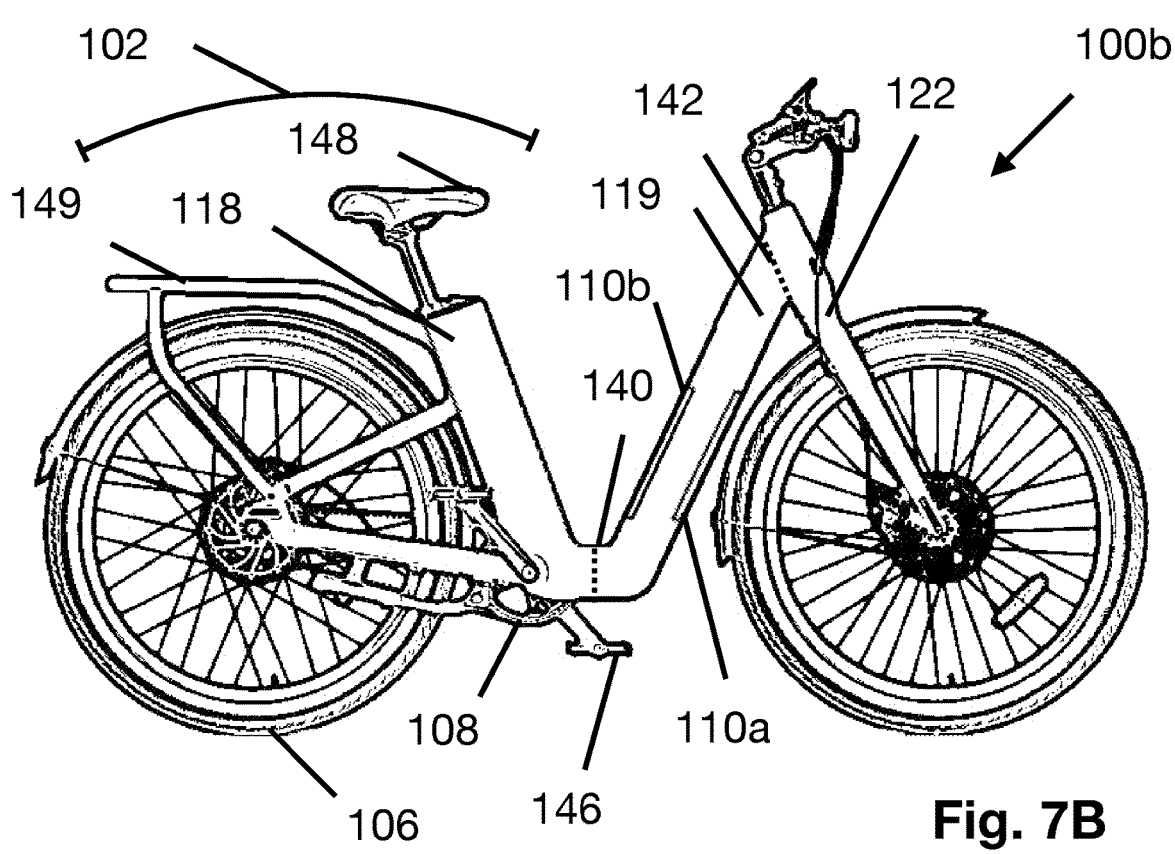
FIG. 7B is a side view of another embodiment of an exemplary motorized vehicle in the form of an electric bike in a riding configuration and having first and second batteries in accordance with the disclosed subject matter.

Referring now to FIGS. 7A-7B, a motorized vehicle 100*a*, 100*b* is configured as as an electric bicycle or "e-bike" and generally includes a deck 102 and one or more frame components 118, 119. Deck 102 and frame components 118, 119 can be formed from any suitable material, which can be lightweight and durable, including but not limited to plastic, aluminum, metal or other suitable materials. A motor (not shown) can be disposed within one or more of frame components 118, 119, such that the motor is mounted to deck 102 via the one or more frame components 118, 119, and can be electrically connected to a power system and driveably connected to wheel 106 by a drivetrain 108 as described herein.

With continued reference to FIGS. 7A-7B, motorized vehicle 100*a*, 100*b* includes battery connection points 110*a*, 110*b* configured to releasably secure a battery thereto. For purpose of illustration only, and not limitation, battery connection points 110*a*, 110*b* of motorized 100*a*, 100*b* can have similar configurations as described with respect to motorized vehicle 100. Moreover, as embodied herein, as shown for example and without limitation in FIG. 7A, motorized vehicle 100*a* can include battery connection point 110*a* configured as a recess in frame component 118 and battery connection point 110*b* configured as recess in frame component 119. As such, as embodied herein, battery connection points 110*a*, 110*b* can be oriented to dispose batteries therein at an angle relative to each other in side view, such as an acute, right or oblique angle. In this manner, battery connection points 110*a*, 110*b* can balance the weight of batteries when disposed therein among frame components and along the horizontal axis of motorized vehicle 100*a*, which can provide balanced weight distribution for more stability when operating.

In an alternative embodiment, as shown for example and not limitation in FIG. 7B, motorized vehicle 100*b* includes battery connection points 110*a*, 110*b* each disposed on opposing sides of a single frame component 119. As such, as embodied herein, battery connection points 110*a*, 110*b* can be oriented to dispose batteries therein substantially parallel to each other in side view. In this manner, battery connection points 110a, 110b can distribute the weight of batteries disposed therein toward the front of motorized vehicle 100b, which can provide a forward weight distribution, for example and without limitation, to accommodate more weight in the deck 102 during riding and/or to allow the opposite end of motorized vehicle 100b to move more freely when operating. Furthermore, or as an alternative, battery connection points 110a, 110b each can be disposed inline or on the same side as frame component 119. In addition, or as a further alternative, battery connection points 110a, 110b each can be disposed in frame component 118 or can be disposed relative deck 102 as shown and described with respect to FIGS. 4-6 and motorized vehicle 100.

Referring again to FIGS. 7A-7B, for example and without limitation, as embodied herein, battery connection points 110a, 110b each can be configured as a recess in corresponding frame component 118, 119 sized to accommodate and configured to releasably sure a battery thereto, such as with a snap-fit mechanism, interlocking hooks, locking clips, hook and pile fabric, magnetic coupling, or any other suitable mechanism. As embodied herein, battery connection points 110a, 110b each can be configured to receive a battery configured as a cartridge or battery pack, and can include a locking feature or receptacle configured to engage a corresponding locking feature or receptacle on the cartridge or battery pack. Battery connection points 110a, 110b each can include one or more electrical connections to electrically connect the cartridge or battery pack to the power circuitry (not shown) of motorized vehicle 100a, 100b, when received by the corresponding battery connection point 110a, 110b for example as described herein with respect to motorized vehicle 100. For example and without limitation, as embodied herein, power circuitry can be disposed entirely or at least in part in one or more of frame components 118, 119 and electrically connected to a motor to drive wheel 106 via drivetrain 108 as described herein.

Referring still to FIGS. 7A-7B, as embodied herein, motorized vehicle 100a, 100b, can further include a steering control, for example configured as steering column 122 extending outwardly from frame component 119 in the riding configuration. Steering column 122 can include a rider control component, such as a steering wheel or handle bars as shown. Steering column 122 can also include one or more shock absorbers or dampers for energy dissipation, for example in the event of a collision, and can provide mounting for one or more components or accessories, including but not limited to, one or more control switches, a column lock, column wiring, throttle, gear selector, gauges, sensors, or other instruments. Steering column 122 can also include a length or height adjustment, such as by a telescoping rod mechanism, to allow the rider to adjust the length or height of the steering column 122 to suit rider size or preference.

Additionally or alternatively, as embodied herein, motorized vehicle 100a, 100b can further include one or more pedals 146, as embodied herein extending from frame component 118. Pedals 146 can be foot-operated to assist the motor 104 to drive drivetrain 108 and wheel 106, which can provide additional power to move motorized vehicle 100a, 100b and/or preserve battery capacity and extend range. Pedals 146 if provided can be configured to fold, pivot, flex or otherwise collapse inward toward frame component 118 in the storage configuration as described further herein. As a further alternative, motorized vehicle 100a, 100b can be free of pedals 146, and optionally, can include foot rests in place of pedals 146 that do not operably connect with drivetrain 108 or wheel 106.

Furthermore, as embodied herein, deck 102 can include one or more seats, for example seat 148 extending outwardly from and substantially in line with frame component 118 and configured to be used by a first rider. Deck 102 can also include rear support structure 149, which can be configured for example and without limitation as a bench to include one or more additional riders and/or to hold cargo. Seat 148 and/of rear support structure 149 can also include a length or height adjustment, such as by a telescoping rod mechanism, to allow the rider(s) to adjust the length or height thereof to suit rider size or preference and/or cargo size. Seat 148 and/or rear support structure 149 can also be configured to move proximate and/or into substantially parallel alignment with frame component 118 in the storage configuration as described herein, for example and as embodied herein by being configured to fold, pivot, flex or otherwise collapse into the storage configuration.

With continued reference to FIGS. 7A-7B, motorized vehicle 100a, 100b can be collapsible from a riding configuration (as shown) to a storage configuration. For example and without limitation, as embodied herein, motorized vehicle 100a, 100b can be configured to have one or more hinged portions 140, 142, which can be formed for example and without limitation as a mechanical hinge or a flexible material interface or joint, that can fold, pivot, flex or otherwise collapse to move joined components into the storage configuration. For example and without limitation, as embodied herein, frame components 118, 119 can be configured to fold, pivot, flex or otherwise collapse along hinged portion 140 toward and/or into alignment with each other to reduce the longest dimension of motorized vehicle 100a, 100b. Additionally or alternatively, as embodied herein, steering column 122 can fold, pivot, flex or otherwise collapse along hinged portion 142 toward and/or substantially into alignment with frame components 118 and/or 119 to reduce the longest dimension of motorized vehicle 100a, 100b in the storage configuration. Seat 148 and/or rear support structure 149 if provided can also be configured to fold, pivot, flex or otherwise collapse proximate and/or substantially parallel with frame component 118 in the storage configuration as described herein. For example and as embodied herein, in the storage configuration, motorized vehicle 100a, 100b can be configured for long-distance transportation, such as air transportation. For purpose of illustration and not limitation, as embodied herein, motorized vehicle 100a, 100b in the storage configuration can have one or more dimensions suitable for transportation in or as checked luggage or carry-on luggage on long-distance transportation, for example any of dimensions Ls and Ws described herein with respect to motorized vehicle 100. As described further herein with respect to motorized vehicle 100, motorized vehicle 100a, 100b can be configured to be transported separately from batteries 114a, 114b, for example and without limitation in or as a checked luggage, in or as a separate carry-on luggage or personal item, or in separate spaces or compartments of a carry-on luggage or personal item.

Referring now to FIGS. 1-11, as embodied herein, motorized vehicles 100, 100a, 100b each has power circuitry 112 configured to power motor 104 using first and second batteries when disposed in battery connection points 110a, 110b. For purpose of illustration and not limitation, power circuitry 112 can operate in conjunction with a throttle configured to control the speed of the motorized vehicle 100,

100a, 100b, for example by adjusting the speed of motor 104. The throttle can include, for purpose of illustration and not limitation, a manual control, such as a hand-actuated accelerator supported by the steering column 122, and/or a computerized control, such as a user interface in communication with a processor as described further herein.

Figure 8:
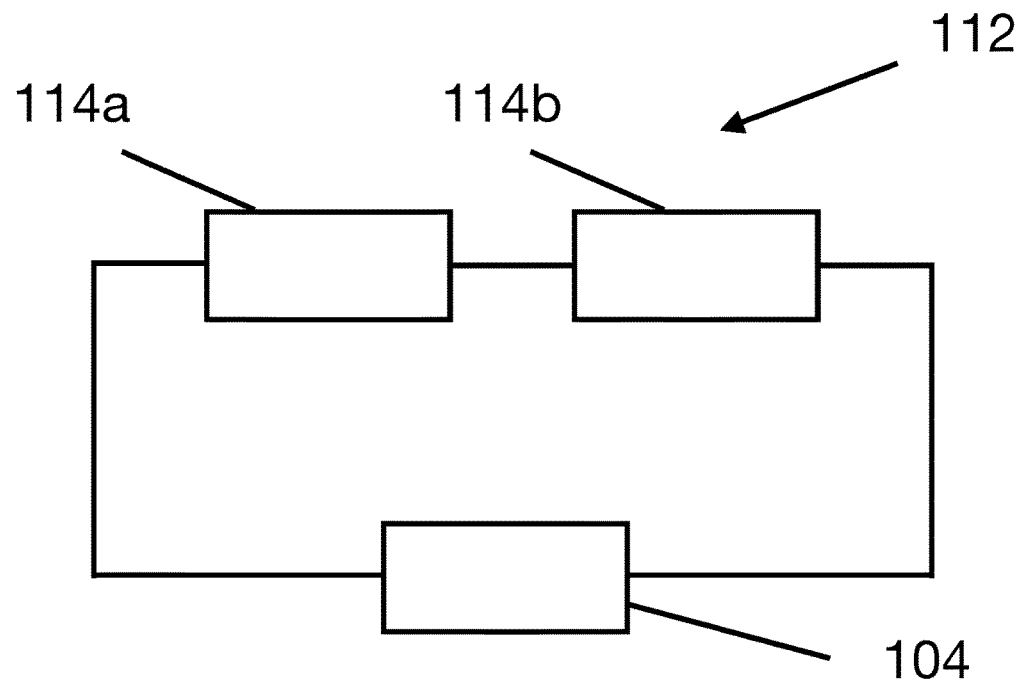
FIG. 8 is a diagram illustrating an embodiment of power circuitry having batteries in a series configuration in accordance with the disclosed subject matter.
Figure 9:
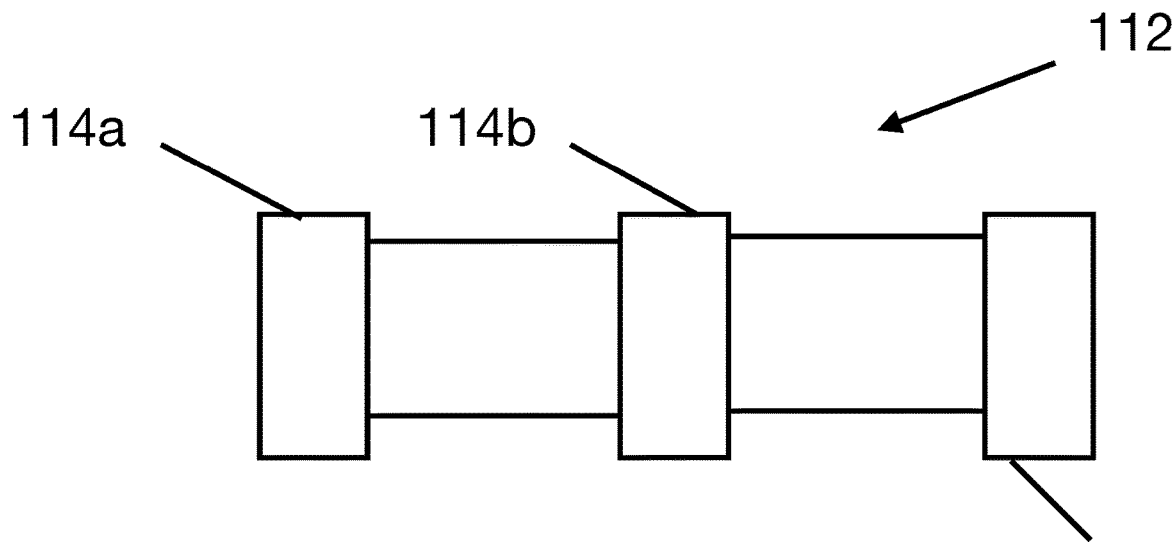
FIG. 9 is a diagram illustrating another embodiment of power circuitry having batteries in a parallel configuration in accordance with the disclosed subject matter.

As shown for example in FIG. 8, power circuitry 112 is configured to power motor 104 using battery 114a in a series configuration with battery 114b. This configuration can combine the output voltage of batteries 114a, 114b to provide more power to motor 104 compared to a single battery. Additionally or alternatively, as shown for example in FIG. 9, power circuitry 112 is configured to power the motor using battery 114a in a parallel configuration with battery 114b. This configuration can distribute the power supplied to power motor 104 among batteries 114a, 114b to provide additional charge capacity and increase the time before the batteries 114a, 114b become depleted, thus providing extended range compared to a single battery.

Figure 10:
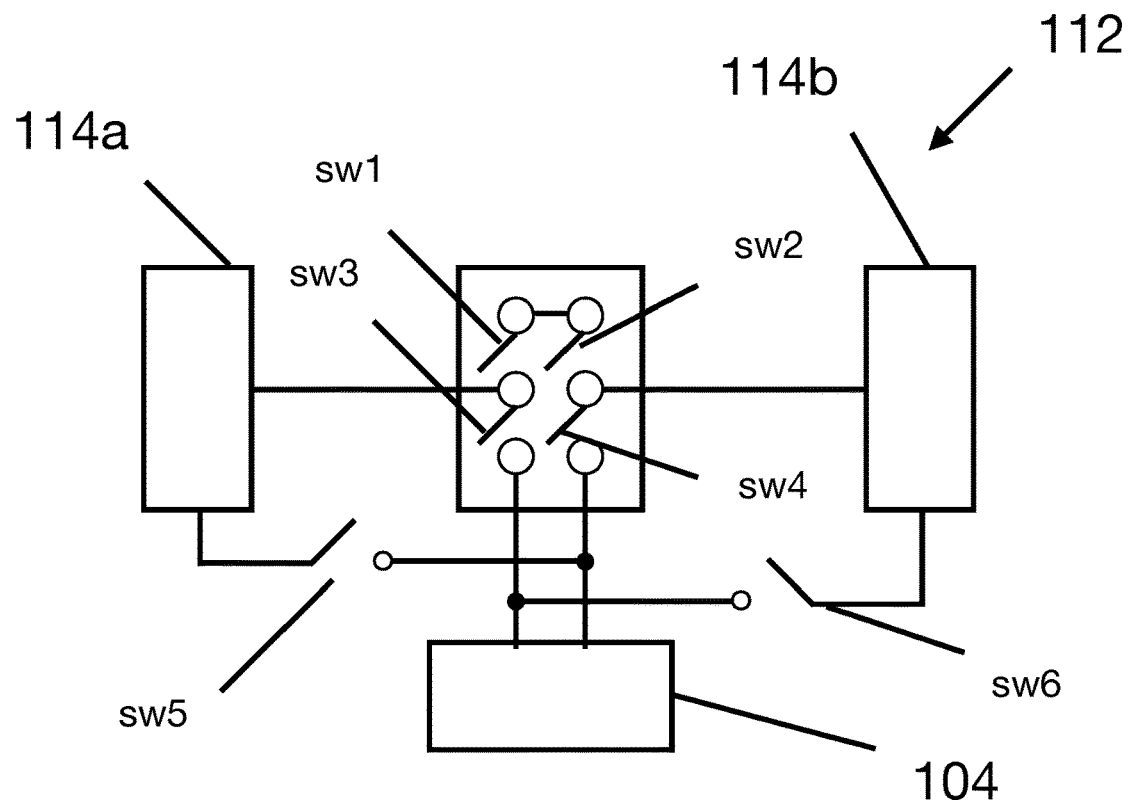
FIG. 10 is a diagram illustrating another embodiment of power circuitry switchable between different power configurations in accordance with the disclosed subject matter.

In addition, or as a further alternative, as shown for example in FIG. 10, power circuitry 112 can be configured to switch between a series configuration and a parallel configuration. For example and without limitation, power circuitry 112 can be configured with a manual switch, for example a mechanical or software switch, that can be operated by a rider. Additionally or alternatively, power circuitry 112 can be configured to switch between the series configuration and the parallel configuration based on the riding conditions of the motorized vehicle 100, 100a, 100b. For example, power circuitry 112 can be configured to switch to the series configuration, with sw1 and sw2 in the on position, and sw3 and sw4 in the off position, when more power is needed from motor 104, for example to reach an increased speed or to move motorized vehicle 100, 100a, 100b up a hill. Power circuitry 112 can also be configured to switch to the parallel configuration, with sw3 and sw4 in the on position and sw1 and sw2 in the off position, to preserve power and extend the time before depletion of batteries 114a, 114b, which can provide additional range. Thus, power circuitry 112 can be configured to automatically switch to the parallel configuration when the parallel configuration is sufficient to power the vehicle to maintain a desired speed. Additionally or alternatively, power circuitry 112 can be configured to automatically switch to the serial configuration when the parallel configuration is insufficient to power the vehicle to maintain a desired speed.

Moreover, as embodied herein, power circuitry 112 can be configured to automatically switch between the series configuration and the parallel configuration based on a charge level of battery 114a or battery 114b. Additionally or alternatively, power circuitry 112 can be configured to automatically switch between the series configuration and the parallel configuration based on one or more measured factors. The one or more measured factors can include, for example and without limitation, a speed of the vehicle, an acceleration of the vehicle, a change in elevation of the vehicle, or external factors such as a change in terrain conditions, a change in weather conditions, a change in visibility or other factors. The one or more measured factors can be measured by one or more sensors as described herein.

Referring still to FIG. 10, power circuitry 112 can be configured to switch to a single battery mode selecting one of battery 114a or 114b. For illustration only and not limitation, power circuitry 112 can be configured to put sw3 and sw5 in the on position, and the remaining switches in the off position, to select battery 114a only, and to put sw4 and sw6 in the on position, and the remaining switches in the off position, to select battery 114b. For example and without limitation, power circuitry 112 can be configured with a manual switch that can be operated by a rider. Additionally or alternatively, power circuitry 112 can be configured to switch to the single battery mode based on any of the measured factors described herein. Furthermore, or as an alternative, power circuitry 112 can be configured to automatically select the single battery mode based on a condition of battery 114a and/or battery 114b. In addition, or as a further alternative, power circuitry 112 can be configured to automatically select the single battery mode based on an absence of battery 114a or battery 114b. For example and without limitation, power circuitry 112 can be configured to automatically select the single battery mode to preserve the first battery or the second battery when the other one of the first battery or the second battery is sufficient to power the vehicle to maintain a desired speed.

Figure 11:
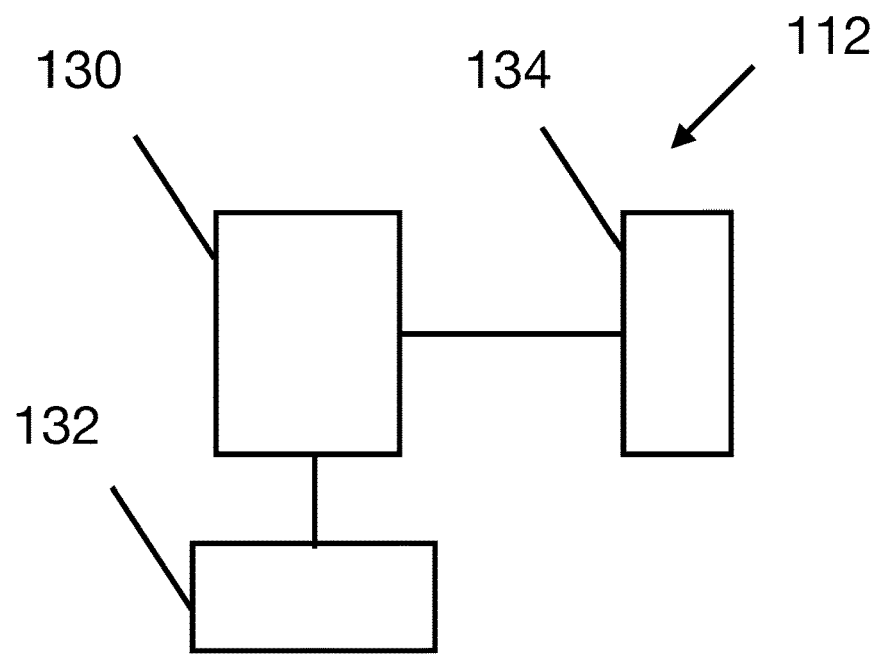
FIG. 11 is a diagram illustrating another embodiment of power circuitry including additional components in accordance with the disclosed subject matter.
Figure 12:
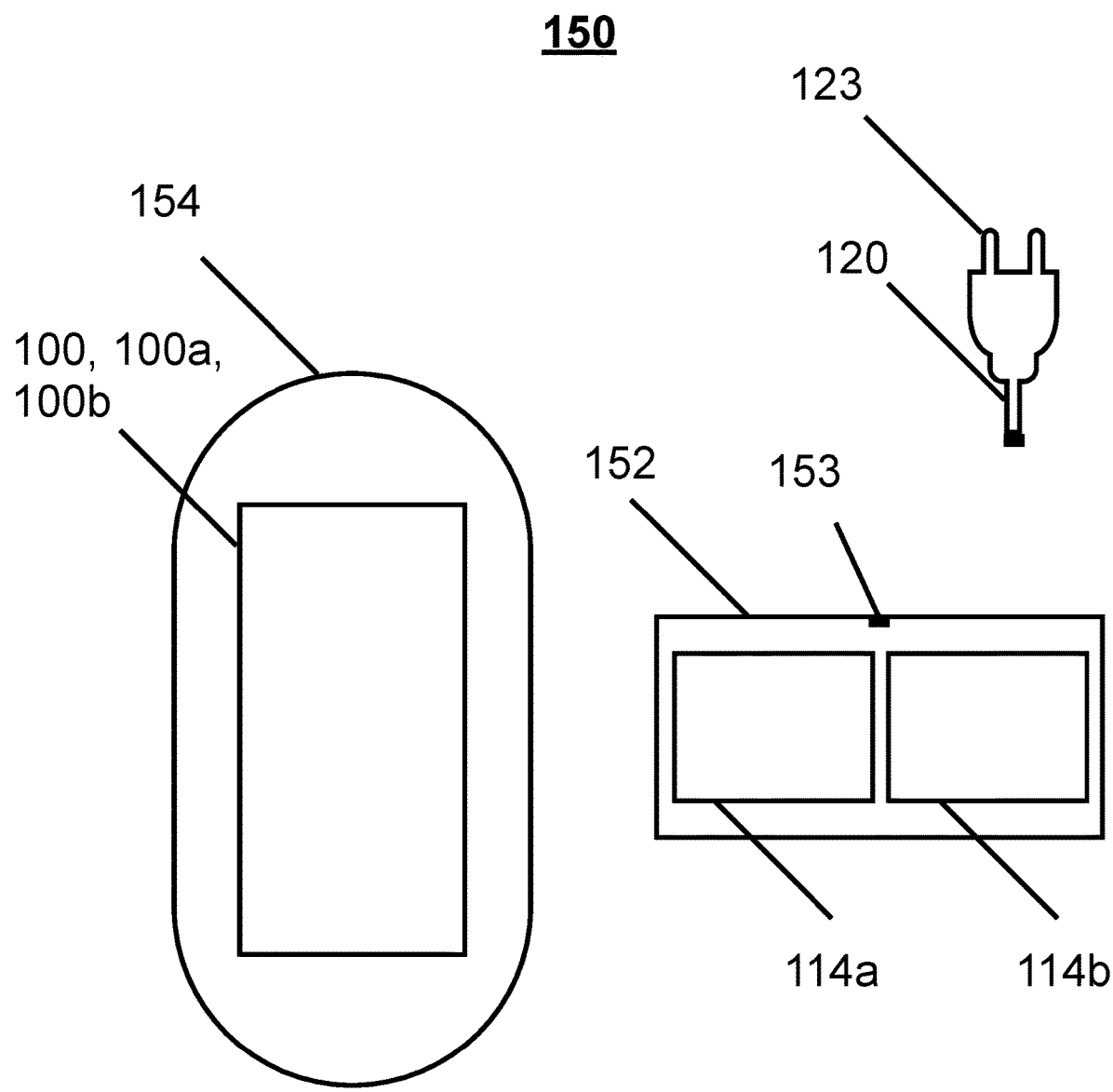
FIG. 12 is a diagram illustrating an embodiment of an exemplary motorized vehicle transport kit in accordance with the disclosed subject matter.

Referring now to FIG. 11, as shown for example and without limitation, power circuitry 112 can include other components. For example, as embodied herein, power circuitry 112 can include a processor 130 configured to perform data processing and control functions described herein. For example and without limitation, processor 130 can be configured to implement any of the features or circuit configurations shown or described with respect to FIGS. 8-10. Processor 130 can be disposed entirely on motorized vehicle 100, 100a, 100b, and/or can have one or more remote components, such as a remote processor in a smartphone, smart glasses, smart watch, or other remote device in communication with power circuitry 112 disposed on motorized vehicle 100, 100a, 100b. Power circuitry 112 can include a user interface 132 to provide feedback and information to a rider and allow for selection of operation of the motorized vehicle 100, 100a, 100b, for example and without limitation, to control or adjust operation of motor 104 and/or steering control of steering column 122. User interface 132 can include, for example and without limitation, a touch-screen display, microphone, or other input device, which can be disposed entirely on motorized vehicle 100, 100a, 100b, or can be entirely or at least partially remote, such as by using a touch-screen display, microphone or other input device of the smartphone, smart glasses, smart watch, or other remote device for example when used as a remote component of processor 130. As embodied herein, user interface 132 can be configured to allow selection of the series configuration or the parallel configuration. Additionally or alternatively, user interface 132 can be configured to allow selection of the single battery mode, including selection of battery 114a or battery 114b. User interface 132 can be configured, for example and without limitation, to allow a rider to adjust the speed of motor 104 and/or steering control of steering column 122, and can be configured to display battery status information, battery specification information, or any other information or parameters described herein. Power circuitry can also include one or more sensors 134 to provide feedback on external factors, such as those described herein, including for example a speedometer (e.g., to detect speed), accelerometer (e.g., to detect acceleration), camera (e.g., to detect movement or obstacles), GPS receiver (e.g. to detect position, movement or elevation), or other sensors configured to measure other external factors, which can be evaluated for example by processor 130 and used to control or adjust the operation of motor 104 and/or steering control of steering column 122 as described herein. Sensors 134 can be disposed entirely on motorized vehicle 100, 100a, 100b, or can be entirely or at least partially remote, such as by using sensors of the smartphone, smart glasses, smart watch, or other remote device for example when used as a remote component of processor 130.

As embodied herein, batteries 114a, 114b each are rechargeable batteries. For example and without limitation, as embodied herein, batteries 114a, 114b each can be rechargeable lithium ion batteries, including but not limited to, lithium-ion lithium cobalt oxide, lithium-silicon, lithium-ion manganese iron phosphate, lithium-ion manganese-oxide lithium-ion polymer, lithium-iron-phosphate, lithium-nickel-manganese-cobalt oxides, lithium-nickel-cobalt-aluminum oxides, lithium-sulfur, lithium-titanate, thin-film lithium-ion, and lithium-ceramic batteries. Additionally or alternatively, batteries 114a, 114b each can be rechargeable nickel metal, lithium metal, aluminum-ion, calcium, vanadium redox, zinc-bromine, zinc-cerium, hydrogen-bromine, lead-acid, glass, magnesium-ion, metal-air electrochemical cell, molten-salt, microbial fuel, nickel-cadmium, nickel-hydrogen, nickel-iron, nickel-lithium, nickel-metal hydride, nickel-zinc, organic radical, polymer-based, polysulfide-bromide, potassium-ion, alkaline, sand, silver-zinc, silver-calcium, silver-cadmium, sodium-ion, sodium-sulfur, solid-state, super iron, wet cell, and zinc-ion batteries. Batteries 114a, 114b each can be releasably removed from motorized vehicle 100 as described herein, and preferably can be packed and transported on long-distance transportation, such as air transportation. As such, batteries 114a, 114b each can have a charge capacity of about 100 watt hours (Wh). Batteries above such charge capacity can be restricted from being carried on at least some long-distance transportation, including but not limited to some air transportation. Additionally or alternatively, batteries 114a, 114b each can have a charge capacity from about 100 Wh to 160 Wh. Batteries having such charge capacity can be allowed to be carried on long-distance transportation, such as air transportation, but can involve special permission and/or inspection of the batteries by the carrier, airline or airline authority. In addition or as a further alternative, batteries 114a, 114b each can have a charge capacity of about 160 Wh, which can be the largest charge capacity allowed to be carried on long-distance transportation, such as air transportation. Each of batteries 114a, 114b can be configured to provide any suitable voltage, for example and without limitation, about 12V, 18V, 24V, 36V, 48V, 60V or any other suitable voltage. Batteries 114a, 114b each can be similarly configured.

For purpose of illustration and not limitation, as embodied herein, using two separate, removable batteries 114a, 114b, each battery 114a, 114b can be removed from the motorized vehicle 100, 100a, 100b, and can be recharged using a separate charging unit. Additionally or alternatively, each battery 114a, 114b can be charged when installed in motorized vehicle 100 by an internal charging unit of power circuitry 112, for example and without limitation by plugging in a charging cable into a charging receptacle on the motorized vehicle 100, 100a, 100b, as described herein. Power circuitry 112 and/or batteries 114a, 114b (or the separate charging unit if provided additionally or as an alternative) can include one or more safety features to prevent overcharging of batteries 114a, 114b, for example and without limitation, using a voltage regulator, charge capacity detector, charging meter, or any other sensor or meter to detect or prevent overcharging. Additionally or alternatively, power circuitry 112 (or the separate charging unit if provided additionally or as an alternative) can include one or more features to prevent charging of malfunctioned, counterfeit or otherwise incompatible batteries, for example, by performing a battery status check or reading a measurement, signature, key or identification of one or more of batteries 114a, 114b. In addition or as a further alternative, the battery connection points 110a, 110b (or similar connection points on the separate charging unit if provided) can be configured to have a size or shape to prevent or inhibit improper installation of batteries 114a, 114b, or prevent or inhibit installation of malformed, counterfeit or otherwise incompatible batteries 114a, 114b.

Batteries 114a, 114b can include additional features. For example and without limitation, one or more of battery 114a, 114b can include a display or indicator, such as an LED display or indicator, which can provide information regarding the status of the battery, such as current charge status, remaining charge, charge time remaining, and any other battery status information. Batteries 114a, 114b can also include one or more heat sinks or fans or other passive or active heat dissipation features.

Each battery 114a, 114b can include separate battery specification information, which can be referred to as appropriate for transport purposes as described herein. For example and without limitation, battery specification information can include a charge capacity rating, voltage rating, operating temperature, quality certification, or any other relevant information regarding the battery properties or safety or operational characteristics. Battery specification information can be visually presented, for example using a label, or as discussed above using an LED screen or other display or indicator. Additionally or alternatively, battery specification information can be wirelessly presented, for example using RFID or Bluetooth programmed to transmit the battery specification information to a smartphone, reader device or wireless display.

According to other aspects of the disclosed subject matter, a motorized vehicle and transport kit is provided. The kit can allow a rider to transport a motorized vehicle, such as motorized vehicle 100, 100a, 100b, on longer range transportation, such as air transportation. As shown for example in FIG. 12, motorized vehicle and transport kit 150 includes a first battery 114a and a second battery 114b, a motorized vehicle 100, 100a, 100b, a battery carrying case 152 configured to contain the first and second batteries 114a, 114b therein, which can be configured as a hard-sided case having a cover movable between an open position and a closed position, and a vehicle carrying case 154 configured to cover motorized vehicle 100, 100a, 100b, which can be configured as a hard-sided or soft-sided case. In this manner, first and second batteries 114a, 114b can be transported separately from motorized vehicle 100, 100a, 100b. For example and without limitation, as embodied herein, battery carrying case 152 can be configured to carry first and second batteries 114a, 114b in a different compartment from motorized vehicle 100, 100a, 100b, in a longer-range transportation vehicle, such as an airplane. For example, and as embodied herein, the battery carrying case 152 can be configured to transport first and second batteries 114a, 114b as or in a carry-on luggage or a personal item. Additionally or alternatively, as embodied herein, motorized vehicle carrying case 154 can be configured to transport motorized vehicle 100, 100a, 100b in a checked luggage compartment, or as further alternatives, in a separate carry-on luggage or personal item from, or in separate spaces or compartments of a single carry-on luggage or personal item with, first and second batteries 114a, 114b.

As embodied herein, the battery carrying case 152 can be formed from one or more of polycarbonate, polypropylene, acrylnitrile-butadiene-styrene (ABS) and aluminum. The battery carrying case 152 can be waterproof in the closed position. The battery carrying case 152 can be configured to orient the first and second batteries 114a, 114b to display battery specification information when the battery carrying case 152 is in the open position, for example upon request for inspection from a carrier, airline, or airline authority. Additionally or alternatively, as embodied herein, battery carrying case 152 can include a transparent portion such as a window configured to be aligned with battery specification information of the first and second batteries 114a, 114b when disposed in the case 152.

As embodied herein, the vehicle carrying case 154 can be expandable to contain the battery carrying case therein. For purpose of illustration and not limitation, as embodied herein, the vehicle carrying case 154 can be formed from one or more of polyester, nylon, ballistic nylon, cordura, canvas and leather or any other suitable soft-sided but durable material. The soft-sided case can include or be configured as a backpack, duffel bag, soft-sided luggage, or other reclosable soft-sided case and can include at least one strap for carrying. Additionally or alternatively, vehicle carrying case 154 can be at least partially or entirely configured as a hard-sided case, for example using any of the materials discussed with respect to battery carrying case 152, which can increase durability of vehicle carrying case 154 with less expandability.

Kit 150 can further include a charging cable, such as charging cable 120. Kit 150 can further include a plurality of charging plugs 123 or plug adapters each configured to be received by the charging cable 120 and each of a plurality of charging plugs 123 or plug adapters, if provided, can have a different plug configuration, such as to be compatible for charging in different countries or regions after longer-distance travel, such as air travel. Power circuitry 112 or batteries 114a, 114b, can also include circuitry, such as power transformers, to accommodate electrical requirements for charging in different countries, including but not limited to voltage requirements or impedance matching. Motorized vehicle 100, 100a, 100b can have a receptacle to receive the charging cable to charge batteries 114a, 114b when disposed therein. Additionally or alternatively, the battery carrying case 152 can have a receptacle 153 to receive the charging cable and charging circuitry to charge the batteries 114a, 114b when releasably removed from motorized vehicle 100, 100a, 100b and disposed therein. In addition, or as a further alternative, each battery 114a, 114b can include charging circuitry and a receptacle to receive a charging cable 120 to charge batteries 114a, 114b.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A motorized vehicle, comprising:
   a deck;
   a motor mounted to the deck;
   a first battery connection point configured to releasably secure a first battery to the motorized vehicle;
   a second battery connection point configured to releasably secure a second battery to the motorized vehicle;
   power circuitry configured to power the motor using the first battery and the second battery and to automatically switch the first battery between a series configuration and a parallel configuration with the second battery based on a charge level of the first battery or the second battery.

2. The motorized vehicle of claim 1, wherein the first battery connection point and the second battery connection point each comprises at least one electrical connector to electrically connect the first or second battery to the power circuitry.

3. The motorized vehicle of claim 1, wherein the first battery and the second battery each has a charge capacity of about 160 watt hours.

4. The motorized vehicle of claim 1, wherein the power circuitry is configured to switch to the serial configuration when the parallel configuration is insufficient to power the motorized vehicle to maintain a desired speed.

5. The motorized vehicle of claim 1, wherein the power circuitry is configured to automatically switch between the series configuration and the parallel configuration based on at least one of a speed of the motorized vehicle or an acceleration of the motorized vehicle.

6. The motorized vehicle of claim 1, wherein the power circuitry is configured to automatically switch between the series configuration and the parallel configuration based on a change in elevation of the motorized vehicle.

7. The motorized vehicle of claim 1, wherein the power circuitry is configured to automatically switch between the series configuration and the parallel configuration based on a change in terrain conditions.

8. The motorized vehicle of claim 1, wherein the motorized vehicle is configured as an electric scooter.

9. The motorized vehicle of claim 1, wherein the motorized vehicle is configured as an electric bicycle.

10. A motorized vehicle, comprising:
    a deck;
    a motor mounted to the deck;
    a first battery connection point configured to releasably secure a first battery to the motorized vehicle;
    a second battery connection point configured to releasably secure a second battery to the motorized vehicle;
    power circuitry configured to power the motor using the first battery and the second battery and to automatically switch the first battery between a series configuration and a parallel configuration with the second battery based on a change in elevation of the motorized vehicle.

11. The motorized vehicle of claim 10, wherein the first battery connection point and the second battery connection point each comprises at least one electrical connector to electrically connect the first or second battery to the power circuitry.

12. The motorized vehicle of claim 10, wherein the first battery and the second battery each has a charge capacity of about 160 watt hours.

13. The motorized vehicle of claim 10, wherein the power circuitry is configured to switch to the serial configuration when the parallel configuration is insufficient to power the motorized vehicle to maintain a desired speed.

14. The motorized vehicle of claim 10, wherein the power circuitry is configured to automatically switch between the series configuration and the parallel configuration based on a speed of the motorized vehicle.

15. The motorized vehicle of claim 10, wherein the power circuitry is configured to automatically switch between the series configuration and the parallel configuration based on an acceleration of the motorized vehicle.

16. The motorized vehicle of claim 10, wherein the power circuitry is configured to automatically switch between the series configuration and the parallel configuration based on a change in terrain conditions.

17. The motorized vehicle of claim 10, wherein the motorized vehicle is configured as an electric scooter.

18. The motorized vehicle of claim 10, wherein the motorized vehicle is configured as an electric bicycle.

19. A motorized vehicle, comprising:
a deck;
a motor mounted to the deck;
a first battery connection point configured to releasably secure a first battery to the motorized vehicle;
a second battery connection point configured to releasably secure a second battery to the motorized vehicle;
power circuitry configured to power the motor using the first battery and the second battery and to automatically switch the first battery between a series configuration and a parallel configuration with the second battery based on a change in terrain conditions.

20. The motorized vehicle of claim 19, wherein the first battery connection point and the second battery connection point each comprises at least one electrical connector to electrically connect the first or second battery to the power circuitry.

21. The motorized vehicle of claim 19, wherein the first battery and the second battery each has a charge capacity of about 160 watt hours.

22. The motorized vehicle of claim 19, wherein the power circuitry is configured to switch to the serial configuration when the parallel configuration is insufficient to power the motorized vehicle to maintain a desired speed.

23. The motorized vehicle of claim 19, wherein the power circuitry is configured to automatically switch between the series configuration and the parallel configuration based on at least one of a speed of the motorized vehicle or an acceleration of the motorized vehicle.

24. The motorized vehicle of claim 19, wherein the motorized vehicle is configured as an electric scooter.

25. The motorized vehicle of claim 19, wherein the motorized vehicle is configured as an electric bicycle.

26. A motorized vehicle, comprising:
a deck;
a motor mounted to the deck;
a first battery connection point configured to releasably secure a first battery to the motorized vehicle;
a second battery connection point configured to releasably secure a second battery to the motorized vehicle;
power circuitry configured to power the motor using the first battery and the second battery and to automatically switch the first battery between a series configuration and a parallel configuration with the second battery based on a change in weather conditions or a change in visibility.

27. The motorized vehicle of claim 26, wherein the first battery connection point and the second battery connection point each comprises at least one electrical connector to electrically connect the first or second battery to the power circuitry.

28. The motorized vehicle of claim 26, wherein the first battery and the second battery each has a charge capacity of about 160 watt hours.

29. The motorized vehicle of claim 26, wherein the motorized vehicle is configured as an electric scooter.

30. The motorized vehicle of claim 26, wherein the motorized vehicle is configured as an electric bicycle.

\* \* \* \* \*